(12) United States Patent
Jha et al.

(10) Patent No.: US 7,446,655 B2
(45) Date of Patent: Nov. 4, 2008

(54) TRACKING LOST AND STOLEN MOBILE DEVICES USING LOCATION TECHNOLOGIES AND EQUIPMENT IDENTIFIERS

(75) Inventors: Anjali Jha, Oceanside, CA (US); Norman Krasner, Emerald Hills, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/956,409

(22) Filed: Sep. 30, 2004

(65) Prior Publication Data

US 2005/0280557 A1 Dec. 22, 2005

Related U.S. Application Data

(60) Provisional application No. 60/580,822, filed on Jun. 18, 2004.

(51) Int. Cl.
*G08B 1/08* (2006.01)
(52) U.S. Cl. .............. 340/539.13; 340/539.1; 340/539.11; 340/539.16; 340/539.32; 455/404.2; 455/433; 455/456.1; 455/441
(58) Field of Classification Search .......... 340/539.1, 340/539.11, 539.16, 539.32, 825.36, 825.49
See application file for complete search history.

(56) References Cited

U.S. PATENT DOCUMENTS

| 5,218,367 | A | * | 6/1993 | Sheffer et al. ............ 342/457 |
| 5,515,419 | A | * | 5/1996 | Sheffer .................. 455/456.5 |
| 5,809,413 | A | * | 9/1998 | Meche et al. ............ 455/411 |
| 5,978,669 | A | * | 11/1999 | Sanmugam ............... 455/410 |
| 6,061,565 | A | * | 5/2000 | Innes et al. .............. 455/436 |
| 6,091,946 | A | * | 7/2000 | Ahvenainen ............. 455/411 |
| 6,119,000 | A | * | 9/2000 | Stephenson et al. ...... 455/432.1 |
| 6,263,187 | B1 | * | 7/2001 | Do ............................ 455/9 |
| 6,377,791 | B1 | * | 4/2002 | Pirila ...................... 455/410 |
| RE38,267 | E | * | 10/2003 | Borkowski et al. ....... 455/456.3 |
| 6,665,529 | B1 | * | 12/2003 | Mills, Jr. .................. 455/411 |
| 6,671,500 | B2 | * | 12/2003 | Damgaard et al. ........ 455/118 |
| 6,816,722 | B2 | * | 11/2004 | Blom et al. .............. 455/410 |
| 6,972,717 | B2 | * | 12/2005 | Sollenberger et al. ..... 342/387 |
| 7,076,257 | B2 | * | 7/2006 | Kall ....................... 455/456.1 |
| 7,106,717 | B2 | * | 9/2006 | Rousseau et al. .......... 370/338 |
| 2003/0130787 | A1 | * | 7/2003 | Clapper .................. 701/207 |
| 2004/0110488 | A1 | * | 6/2004 | Komsi ..................... 455/411 |
| 2006/0019664 | A1 | * | 1/2006 | Nelakanti et al. ......... 455/436 |

OTHER PUBLICATIONS

International Search Report—PCT/US05/021052, International Search Authority—European Patent Office—Mar. 21, 2006.

* cited by examiner

*Primary Examiner*—George A Bugg
*Assistant Examiner*—Son M Tang
(74) *Attorney, Agent, or Firm*—Andrea L. Mays; Linda C. Gunderson; Thomas R. Rouse

(57) ABSTRACT

A system for geographically locating and tracking mobile stations within a mobile communication network. The system includes an equipment identity register (EIR) comprising equipment identifiers, such as internal mobile equipment identities (IMEIs), subscriber identity modules (SIMs), or some combination thereof, that are each uniquely associated with mobile stations operable within the network. Each IMEI may be used to identify a particular status of an associated mobile station. A mobile switching center (MSC) or an external location services (LCS) client may be configured to identify a targeted mobile station based upon its status (for example, lost, stolen, malfunctioning, and the like). A serving mobile location center (SMLC) responsively provides position location information for the targeted mobile station.

14 Claims, 6 Drawing Sheets

TRACKING LOST AND STOLEN MOBILE DEVICES USING LOCATION TECHNOLOGIES AND EQUIPMENT IDENTIFIERS

CROSS REFERENCE TO RELATED APPLICATIONS

This application claims priority from copending provisional U.S. patent application Ser. No. 60/580,822, filed Jun. 18, 2004.

BACKGROUND

1. Field of the Invention

The present invention relates generally to the field of mobile communications, and more particularly to locating mobile devices having equipment identifiers of a particular status.

2. Relevant Background

Presently, mobile telephones and devices, particularly those based upon the global system for mobile communications (GSM) standard, contain an electronic module commonly known as a subscriber identity module (SIM). The SIM uniquely identifies a subscriber and is used to store data to be used by the mobile device, and may also contain appropriate authentication functions. In addition to the SIM, the mobile device is identified using an equipment identifier known as an internal mobile equipment identity (IMEI).

In current GSM based systems, for example, subscribers are typically identified using data contained in the SIM, rather than the IMEI. The SIM is typically removable and may be utilized in different mobile devices. Conventional GSM based systems allow a user to insert their SIM card into any mobile device. Malicious individuals have recognized that a stolen mobile device may be used with a different, legally obtained SIM card. A typical scenario is where an inexpensive mobile device is purchased to obtain a legitimate SIM card. The SIM card is then removed from the legitimate device and inserted into a stolen device. The stolen device is typically much more elaborate and expensive than the legitimate device. Since the network will identify the device using the legitimate SIM, rather than the IMEI of the stolen device, the user may be able to operate the stolen mobile device with impunity.

Various techniques have been devised to detect stolen devices based upon the IMEI. In general, these techniques employ some scheme to detect the IMEI of devices being used within the network, and then querying a database to determine if the device has been lost or stolen. Existing fraud detection technologies have achieved considerable success by disabling a stolen device so that it no longer functions within the network. However, there is an increasing desire to not only disable stolen devices, but to locate and track such devices so that they may be recovered by the authorities and the perpetrators brought to justice.

SUMMARY

A system for geographically locating and tracking mobile stations within a mobile communication network includes an equipment identity register (EIR) comprising equipment identifiers, such as internal mobile equipment identities (IMEIs), that are each uniquely associated with mobile stations operable within the network. Each IMEI may be used to identify a particular status of an associated mobile station. A mobile switching center (MSC) or an external location services (LCS) client may be configured to identify a targeted mobile station based upon its status (for example, lost, stolen, malfunctioning, and the like). A serving mobile location center (SMLC) responsively provides position location information for the targeted mobile station.

In accordance with other embodiments, a method for geographically locating a mobile station within a mobile communication network includes obtaining IMEIs, which are each uniquely associated with individual mobile stations that are operable or present within the communication network. Once these IMEIs have been obtained, targeted mobile stations that have equipment identifiers of a particular status may then be identified and their geographical locations calculated.

DETAILED DESCRIPTION

In the following detailed description, reference is made to the accompanying drawing figures which form a part hereof, and which show various embodiments by way of illustration. It is to be understood that other embodiments may be utilized, and structural, electrical, as well as procedural changes may be made without departing from the scope of the present invention.

First of all, the term "location" as used herein may have several different meanings depending upon the particular context in which this term is used. For example, in one context, the "location" of a mobile station refers to the relative positioning of the device within a communication network in which the mobile station is currently communicating. This location information may be used for such things as call routing and customer billing.

In another context, the terms "position location," "geographical location," or simply "location" will be interchangeably used to denote the geographic location of a mobile station. In such contexts, these terms denote the geographic location or position location of a mobile station, which can be calculated using elaborate positioning methods and techniques. The particular meaning of the "location" term will be clear based upon the surrounding context in which the term is utilized.

Figure 1:
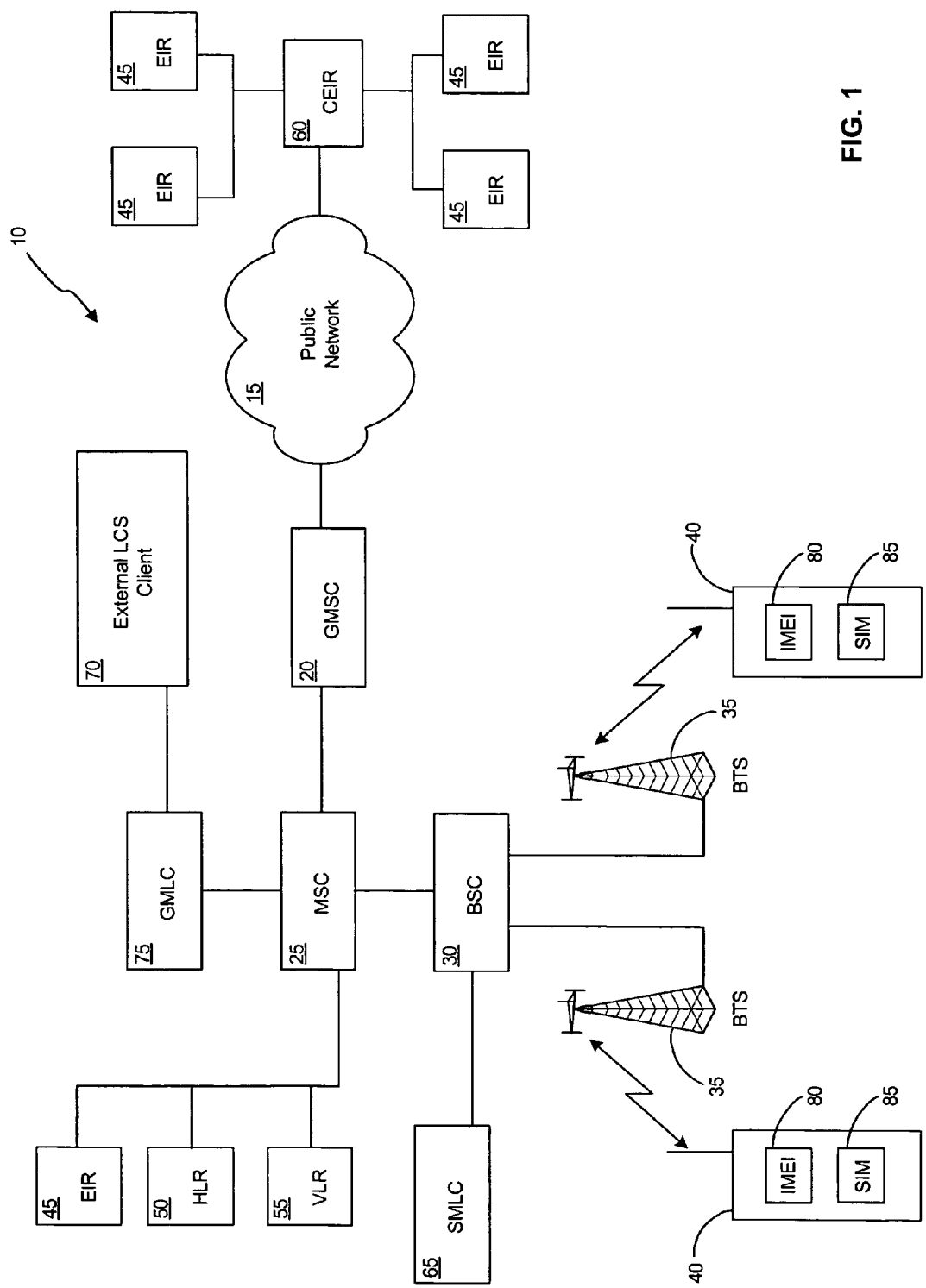
FIG. 1 illustrates an exemplary mobile communication system.

FIG. 1 illustrates a mobile communication system 10 having a public network 15, a gateway mobile and switching center (GMSC) 20, and a mobile switching center (MSC) 25. The MSC is in communication with at least one base station controller (BSC) 30, which is shown in contact with two base transceiver stations (BTSs) 35, which are illustrated for simplicity as radio towers. Each BTS provides wireless communication to one or more mobile stations (MSs) 40. For simplicity only, the communication system 10 is shown having two BTSs 35 and two MSs 40. However, it is to be understood that there may be a number of BTSs 35, each providing communication coverage to a plurality of MSs 40.

The BSC 30 manages telecommunication functions associated with the BTS 35. The BSC may provide power control, call resource allocation, and mobility management functionality including, when necessary, the orchestration of handoffs between the BTSs 35. The MSC 25 coordinates all communication channels and processes, and provides access for the MS to networks, such as the public network 15.

The public network 15 may be a public switch telephone network (PSTN), integrated services digital network (ISDN), public land mobile network (PLMN), circuit switched public data network (CSPDN), packet switched public data network (PSPDN), and the like. The communication system 10 is shown having an equipment identity register (EIR) 45, a home location register (HLR) 50, and a visitor location register (VLR) 55. The EIR, HLR, and VLR are shown as individual components of the network, but some or all of these components may be integrated with the MSC 25, if so desired.

The HLR is used by the network operator, often referred to as a service provider, to maintain subscriber data. Subscriber data includes both fixed data, such as user profiles and international mobile subscriber identities (IMSI), and dynamic data such as the whereabouts of a mobile station and current settings for any supplementary services.

In most mobile communication systems, such as the system depicted in FIG. 1, some scheme is necessary to track the location and status of the mobile stations or devices present within the system. Using a process called registration, the MS 40 notifies a system controller, such as the MSC 25, of its status and location. The MSC also records location information in a database, such as the VLR 55, and refers to the VLR upon receipt of a message intended for the particular mobile station to decide which base station should be used to relay the message. The VLR is therefore used as a local cache to store subscriber data near the current location of the MS 40.

A mobile station is active when it has registered in the network and can make or receive a call. When a mobile station initially becomes active, most of the subscriber information concerning the mobile station is recorded in the HLR. In the example of FIG. 1, when the MS 40 goes active, the HLR subscriber information associated with the MS, which is maintained in the HLR 50, is loaded or otherwise copied into the VLR of the MSC in which the mobile station is currently located. An active but idle mobile station may also periodically transmit a message in which it reports its location, thus causing the updating of the mobile station location in the VLR. In addition, whenever a mobile station roams into a new area serviced by a different VLR, the HLR downloads the subscriber data to the new VLR.

The EIR 45 includes a database which contains information regarding the validity and status of mobile stations using a unique identifier, which is often referred to as an international mobile equipment identifier (IMEI). In general, an EIR contains three primary groups of IMEI data. One is the "white list" which includes the range of valid mobile stations that are approved for operation within the network. Another is the "black list" which includes the list of IMEI numbers which have been reported stolen, lost, defective, malfunctioning, or otherwise deemed forbidden to operate within the network. The third group, referred to as the "grey list," is an intermediate list between "white" and "black" and includes suspicious mobile stations that are currently under supervision by authorities to confirm black listing.

The IMEI may therefore indicate the status of a particular mobile station as approved for operation (white list), forbidden to operate within the network (black list), or approved to operate but under supervision (grey list). Alternatively or additionally, the IMEI may indicate a more detailed status, such as the mobile station is lost, stolen, malfunctioning, and the like. As will be described in more detail below, the position location of particular mobile stations may be calculated whenever the device has a particular status such as being black listed or having been identified as lost or stolen.

If desired, the EIR 45 may be updated on a periodic or continuous basis with data present in a central equipment identity register (CEIR) 60. The CEIR is a centralized database that collects information, such as black, white, and grey list IMEIs, on mobile stations from other EIRs 45 associated with other communication networks (not shown).

The serving mobile location center (SMLC) 65 controls the position location procedure for identifying the position location of a particular mobile station, and performs an assortment of position location-related measurements. In particular, the SMLC computes the geographic position or location of the MS 40 from data received from associated components, such as the BSC 30, BTS 35, and MS 40 for MS-assisted position location technologies, and assists in position location-related measurements and geographical location/velocity estimation for MS-based position location technologies.

The SMLC may implement one or more conventional and well-known positioning methods including, for example, MS-assisted, MS-based, and network-assisted positioning methods. Specific examples of suitable methods that the SMLC may implement for computing the geographic location of the MS 40 include timing advance (TA), time of arrival (TOA), angle of arrival (AOA), observed time difference (OTD), time difference of arrival (TDOA), enhanced observed time difference (EOTD), observed time difference of arrival (OTDOA), global positioning system (GPS), assisted GPS (AGPS), geographical proximity detection (for example, RFID), cell sector, mixed cell sector, ranging via signal strength, various hybrids and combinations of such methods, and the like.

The gateway mobile location center (GMLC) 75 provides an interface to external clients, and provides these clients with the position location of particular mobile stations, such as those having grey or black listed IMEI numbers. As shown in FIG. 1, the GMLC provides an interface for external position location services (LCS) client 70. During a position location operation, the GMLC interfaces with the HLR 50 and the VLR 55 to determine the current SMLC for the mobile station, and uses that SMLC to obtain the position location estimate for the LCS client. In accordance with some embodiments, a position location request may originate at the LCS client. An LCS client is an entity which seeks the position location of a particular mobile station based upon the particular status of the mobile station (for example, lost or stolen). Typical LCS clients include, for example, law enforcement, insurance companies, network operators, service providers, and public safety agencies, among others.

The functionality of the GMSC 20, MSC 25, BSC 30, EIR 45, HLR 50, VLR 55, SMLC 65, and GMLC 76 are shown in FIG. 1 as distributed. However it is to be understood that the functionality of one or more of these components could likewise be centralized into a single module. Furthermore, the connectivity of these components may differ from that shown in FIG. 1. For example, the SMLC may be connected to and serve more than one BSC 30.

The MS 40 is a terminal that communicates with the BTS 35. The MS may also be referred to as a remote station, cellular telephone, access terminal, mobile device, user equipment, or some other terminology. Each mobile station in the communications network, such as the MS 40, may include a unique equipment identifier that identifies the mobile station. International mobile equipment identity (IMEI) 80 is one example of such an identifier and is typically stored in the mobile station at the time of manufacturing. The MS 40 may also include an identity module, which may be used for identifying the subscriber. In the GSM, such a module is commonly referred to as a subscriber identity module (SIM). The SIM 85 may be a processor card or a smart card positioned within the MS 40. The SIM enables the subscriber to use the MS, and it typically contains various types of subscriber information.

Although embodiments are described and illustrated in the context of a GSM network standard, the techniques described herein for locating particular mobile stations may be implemented in accordance with other standards and networks. For example, the system 10 may alternatively implement a code division multiple access (CDMA) system. Such a CDMA system may be designed to implement one or more standards including, for example, cdma2000, IS-856, W-CDMA, Universal Mobile Telecommunications System (UMTS), IS-95, and the like. A CDMA system, for example, may be implemented by substituting some of the components depicted in FIG. 1 with CDMA supported components that provide the same or similar functionally. For example, a CDMA system may substitute a positioning determining entity (PDE) for the SMLC 65, a user identity module (UIM) for the SIM 85, and an electronic serial number (ESN) or Mobile Equipment Identity (MEID) for the IMEI 80.

The system depicted in FIG. 1 may be used to identify and locate certain mobile stations of interest based upon a particular status of the mobile station. For convenience only, embodiments of the invention will be described with respect to a stolen mobile station having an IMEI that is found on the "black list" of the EIR 45 database. It is to be understood that many other variations and implementations are possible and within the teachings of the present disclosure. As such, the system shown in FIG. 1 may be used to locate mobile stations that have a particular status (for example, black listed, grey listed, lost, stolen, defective, and so on), as determined by the equipment identifier associated with the targeted mobile station.

Figure 2:
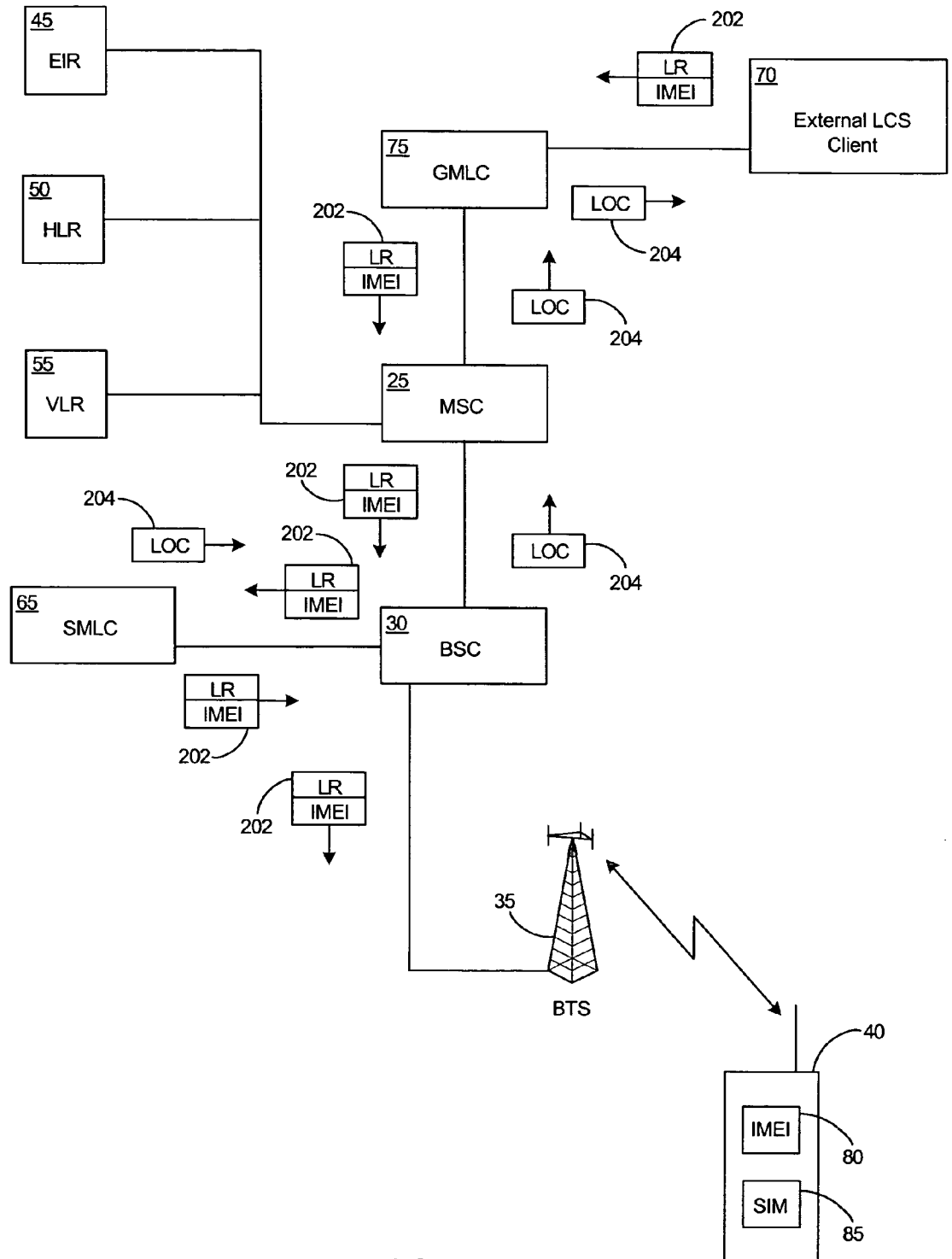
FIG. 2 illustrates a mobile station location process.

FIG. 2 shows an exemplary position location process and will be described in connection with the flowchart of FIG. 3. As indicated in block 200, the position location process may be initiated by the external LCS client 70 sending a position location request 202 to the GMLC 75. In some situations, the LCS client will know the IMEI of the stolen MS 40 and will include this information in the request. Various methods for obtaining the IMEI of a stolen mobile station will be described in more detail in conjunction with FIG. 4. In any event, the position location request is received by the GMLC 75, which forwards the request to the serving MSC 25 (block 205).

When the MSC 25 receives the position location request 202, the MSC sends a request for routing information to the HLR 50 and VLR 55 (block 210). The HLR 50 may check its records to confirm that the MS 40 is registered in the HLR 50, and that routing information is available. As indicated in optional decision block 215, if the MS 40 is not currently located within the network served by the MSC 25, then the position location request may be terminated and the LCS client notified of the result (block 220). On the other hand, if the MS 40 is currently located within the network, the MSC 25 sends the position location request 202 to the SMLC 65 via the serving BSC 30 (block 225).

In block 230, the SMLC 65 initiates an appropriate position location procedure for identifying the location of the stolen MS 40. This position location procedure typically results in a position location message exchange between the SMLC 65 and the MS 40. The specifics of this message exchange are determined by the position location procedure utilized. As noted above, a specific position location method is not required, and almost any conventional position location determining technique may be used (for example, TA, TOA, AOA, OTD, TDOA, EOTD, OTDOA, GPS, and AGPS, among others as discussed previously).

In block 235, regardless of the location procedure utilized by the SMLC 65, the SMLC may obtain a final position location 204 of the stolen MS 40, which is either provided by the MS or estimated by the SMLC. The calculated position location may identify the geographical position of the stolen MS with an accuracy of anywhere from a few yards to a few hundred yards. Depending upon the location procedure utilized, the position location data 204 may also include the velocity of the stolen MS. Once calculated, the location data 204 may be communicated to the requesting entity, such the LCS client 70, via the BSC 30, MSC 25, and the GMLC 75 using standard or proprietary interfaces and signaling technologies (block 240).

The calculated position location data 204 may alternatively or additionally be communicated to other devices or systems for storage and later retrieval. For example, the position location data 204 may be stored in a suitable database such as one or more of the EIR 45, HLR 50, VLR 55, or some other database. If the position location data 204 of the stolen MS 40 is stored at the EIR 45, this data may be associated with the IMEI of the stolen MS 40, thus providing a convenient pairing of data associated with the stolen MS 40. Storing the position location data permits later retrieval of this information by external LCS clients which may, or may not, be the same entity that originally submitted the location request. This aspect will be described in more detail in conjunction with FIGS. 5 and 6.

Figure 3:
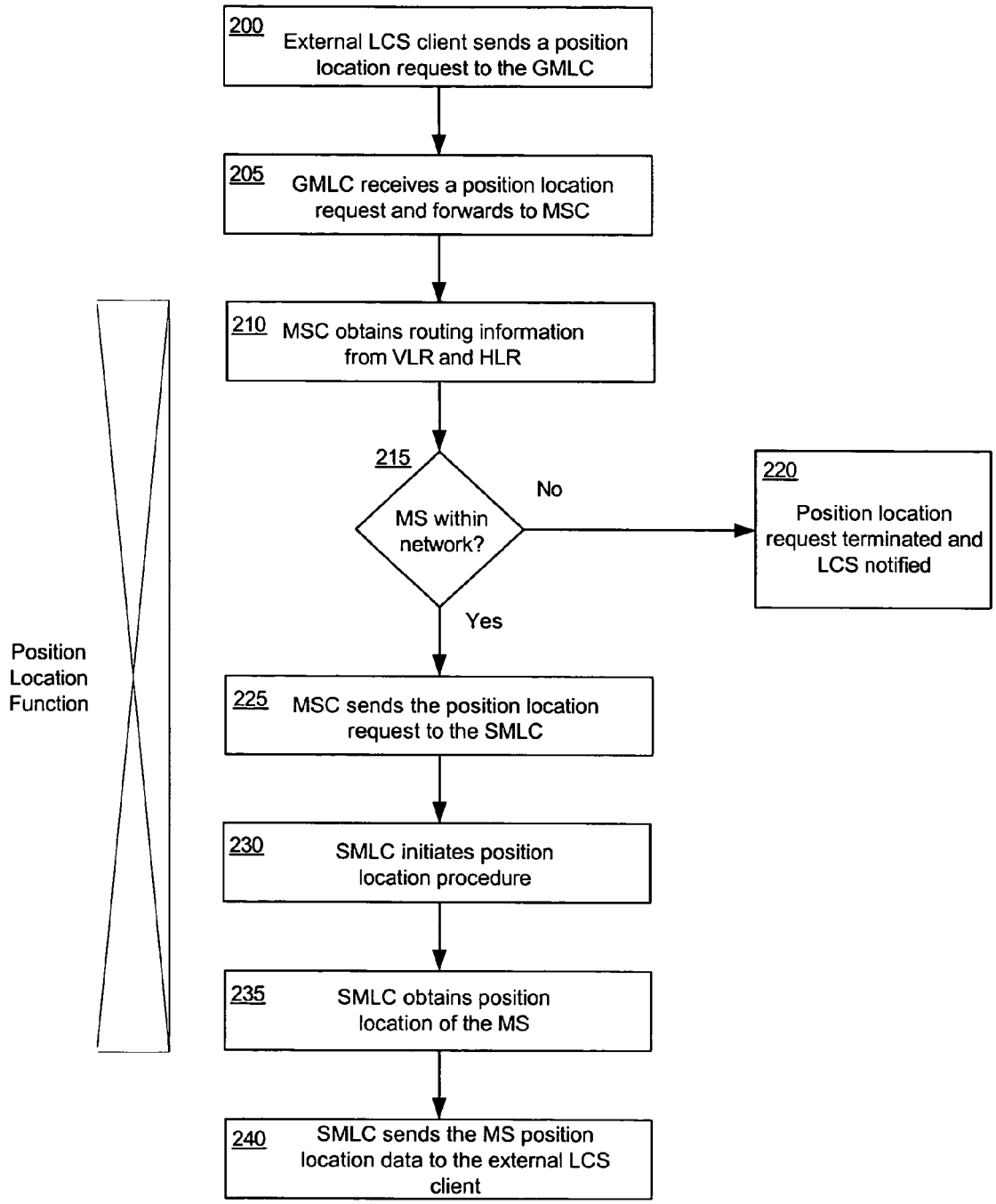
FIG. 3 illustrates operations for locating a mobile station.

Referring back to block 200 of FIG. 3, the external LCS client 70 is described as issuing a position location request for a mobile station having a black listed IMEI. To do so, the LCS client will typically acquire knowledge of the black listing of the mobile station. In accordance with various embodiments of the invention, this knowledge may come from any number of possible sources, as will now be described.

Figure 4:
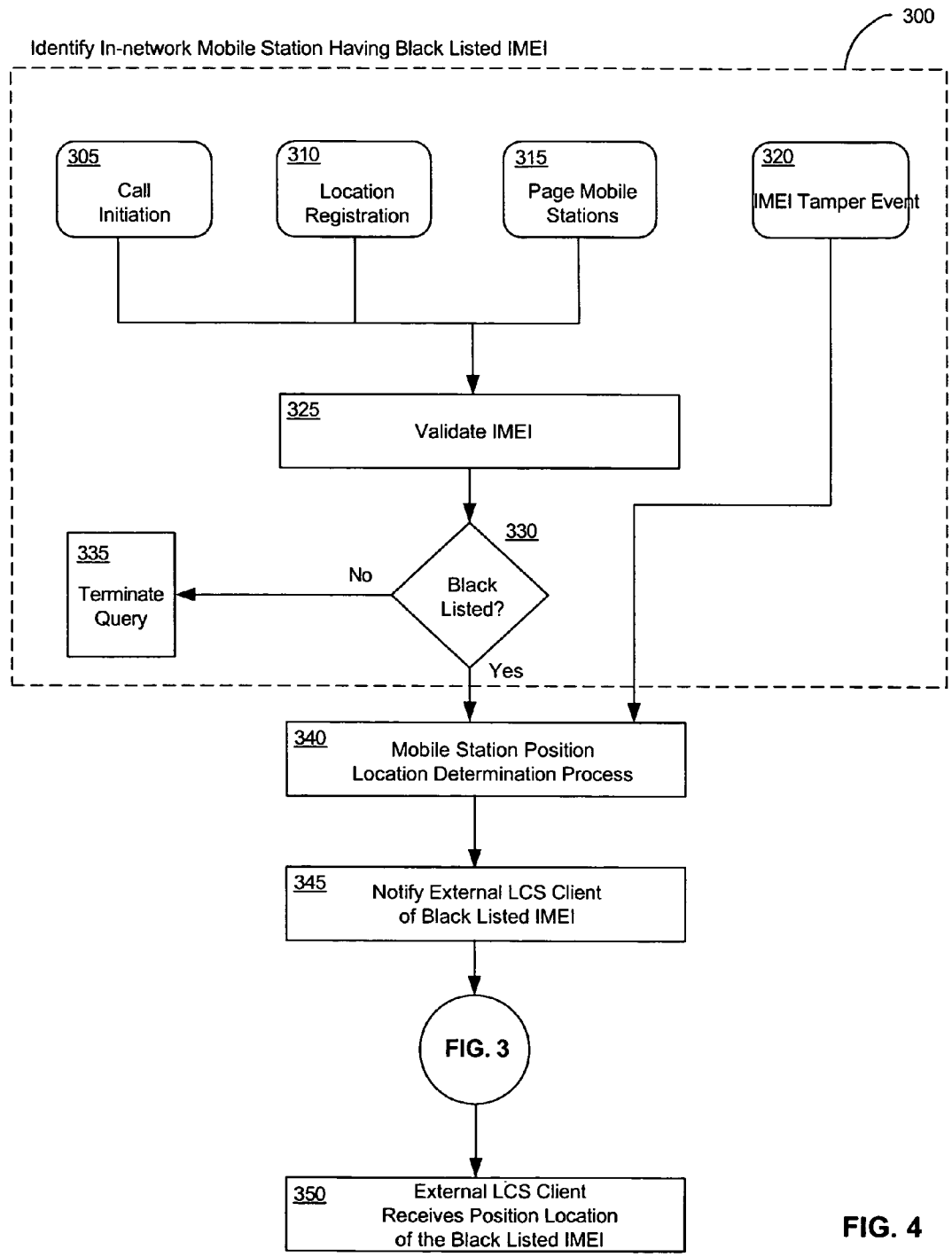
FIG. 4 illustrates operations for identifying and locating a mobile station.

FIG. 4 depicts various techniques for detecting the presence of mobile devices having an IMEI of a particular status (for example, black listed or grey listed), and how such information may be used in locating the targeted mobile system. First of all, block 300 includes several different techniques for obtaining the IMEI of mobile systems that are present within the network. As shown, these techniques include call initiation (block 305), location registration (block 310), paging (block 315), and detection of an IMEI tamper event (block 320).

In accordance with block 305, a typical call initiation process is where the subscriber utilizes the MS 40 to place or receive a call. At some point during this call, the system may query the IMEI of the MS 40 by an over-the-air command. This IMEI query will typically originate at the MSC 25, but this is not required. Once the IMEI has been obtained, it may be validated by checking with the EIR 45 to see if it is found on the black list, or otherwise identified as being a targeted or forbidden IMEI (block 325). As indicated in decision block 330, if the IMEI is deemed valid and not found on the EIR black list, then the query process may terminate (block 335). However, if the IMEI of the MS 40 is found on the black list, then this event may trigger a mobile station position location determination process, as indicated by block 340.

In accordance with some embodiments, the position location determination process may cause the GMLC 75, for example, to send the external client LCS 70 a notification of this event. A typical notification may include the IMEI of the stolen mobile station, and quite possibly pertinent subscriber information that is readily available from the HLR 50 or other database. Block 345 indicates that the location process may then proceed according to the flowchart depicted in FIG. 3. As previously described, the FIG. 3 process results in the identification of the geographical location of the stolen MS 40. The calculated location of the stolen MS 40 is communicated to, and subsequently received by, the LCS client 70 (block 350).

Referring back to block 310, another technique for obtaining the IMEI of mobile systems that are present within the network utilizes a conventional process known as location registration. Registration may occur whenever the MS 40 is activated or enters a location served by a particular BTS 35. During this registration process, various messages are exchanged between the MS 40 and MSC 25. In some instances, the exchanged messages include the SIM of the MS 40. The SIM may then be mapped to its associated IMEI using data obtained from, for example, the HLR, VLR, EIR or some other database. Once the IMEI has been obtained, it may be validated using the process previously described in blocks 325 and 330. As before, the existence of the IMEI on the black list may be used to trigger a position location determination process, as previously described in blocks 340 through 350.

Block 315 depicts yet another technique which may be used to obtain the desired IMEI information. In accordance with this technique, the system may periodically query the IMEI of some or all of the mobile stations currently located or otherwise operating within the network. This query may include active as well as idle mobile stations. This technique may be initiated on a regular basis (for example, once a week, every day, every hour, and so on), and may be adjusted to meet a particular need. Similar to other embodiments, a black listed IMEI may initiate a location determination process, as set out in blocks 325 through 350.

Yet another technique for obtaining the IMEI utilizes data generated in response to a detected tampering of the IMEI within the MS 40. As previously described, the MS may be configured with the IMEI 80 during manufacturing, and is permanently stored in the MS. However, malicious individuals have devised schemes for changing the otherwise permanent IMEI. IMEI tampering may be accomplished electrically, physically, or via software. For example, the IMEI may be changed or modified by electrically corrupting the memory location of the mobile station that contains the IMEI. Another technique is to physically change the memory chip containing the IMEI and replace it with another chip having a white listed IMEI. Yet another technique is to reprogram the IMEI using software in a procedure referred to as cloning. Cloning is where the IMEI of a legal device is copied or "cloned" into a device which is stolen, illegal, or otherwise forbidden from operating on the network. By changing the IMEI, an illegal mobile station may be permitted access to the network.

To circumvent illicit or unauthorized changing of an IMEI, the MS 40 may be configured to monitor the IMEI that is stored in the device. If a change in the IMEI is detected, the MS 40 may notify the system by initiating a page to the serving MSC 25, for example. This page may include a message containing the original IMEI as well as the new IMEI. In order to perform such functions it may be necessary for the MS to store the IMEI and/or some data associated with the IMEI (for example, data obtained during a cyclic redundancy check (CRC)) in more than one location within the MS, with at least one such location being write protected. The MSC 25 may then update the EIR 45 to include the new IMEI on the black list. The detection of a tamper event results in the detection of a IMEI that may automatically be determined to be black listed since it represents an illegal IMEI. As such, the validation process of blocks 325 and 330 may be skipped, and processing may flow to the location determination process at block 340. The new IMEI may then be used to trigger the location determination process of blocks 340 through 350.

Figure 5:
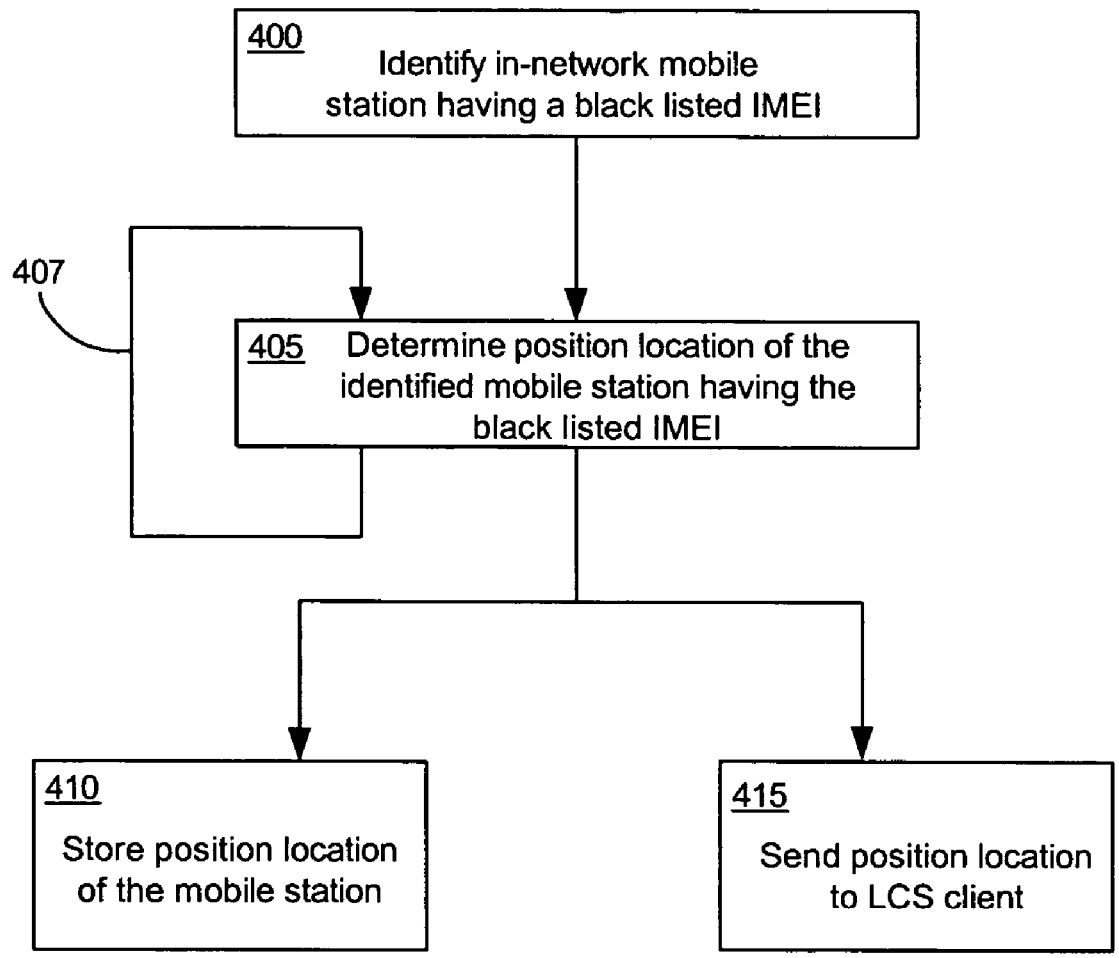
FIG. 5 illustrates operations for identifying and locating a mobile station.

FIG. 5 shows an another exemplary process for identifying and locating lost, stolen, or otherwise forbidden mobile stations according to alternative embodiments of the invention. As denoted by block 400, an initial operation includes obtaining an IMEI for mobile stations that are currently active within the network, and identifying which of these mobile stations have an IMEI that is found on a black list of the EIR 45. Any of a variety of different methods may be used for obtaining this black listed IMEI including, for example, any of the methods depicted in block 300 of FIG. 4.

Once a black listed IMEI has been obtained or otherwise identified, the targeted mobile station associated with the black listed IMEI may then be located using a suitable position location determination method (block 405). The position location operation of block 405 may be accomplished using, for example, the position location determination process (which may include estimation of mobile coordinates and velocity) depicted in blocks 210-235 of FIG. 3. In FIG. 5, the position location operation of block 405 results in the identification of the geographical location of the stolen MS 40. If desired, the position location determination process may be repeated on a periodic or continuous basis, as indicated by reference arrow 407. This feature allows the location of the stolen MS 40 to be tracked over time.

Once the geographical location of the stolen MS 40 has been identified or otherwise determined, there are several options for utilizing this information. For example, as indicated in block 410, the location data may be stored in a database, such the EIR 45, HLR 50, VLR 55, or other suitable location (for example the MSC 25, SMLC 65, GMLC 75). The stored data can also be made available to the external LCS clients 70 seeking the recovery of stolen mobile stations.

Another option, as indicated in block 415, is to communicate the geographical location information of the stolen MS 40 to the appropriate LCS client 70. The location information may be communicated in real-time, or near real-time, but this is not a requirement. Yet another option is to both store the location data and communicate this data to one or more LCS clients 70. Such an embodiment may be accomplished by performing both operations of blocks 410 and 415.

Figure 6:
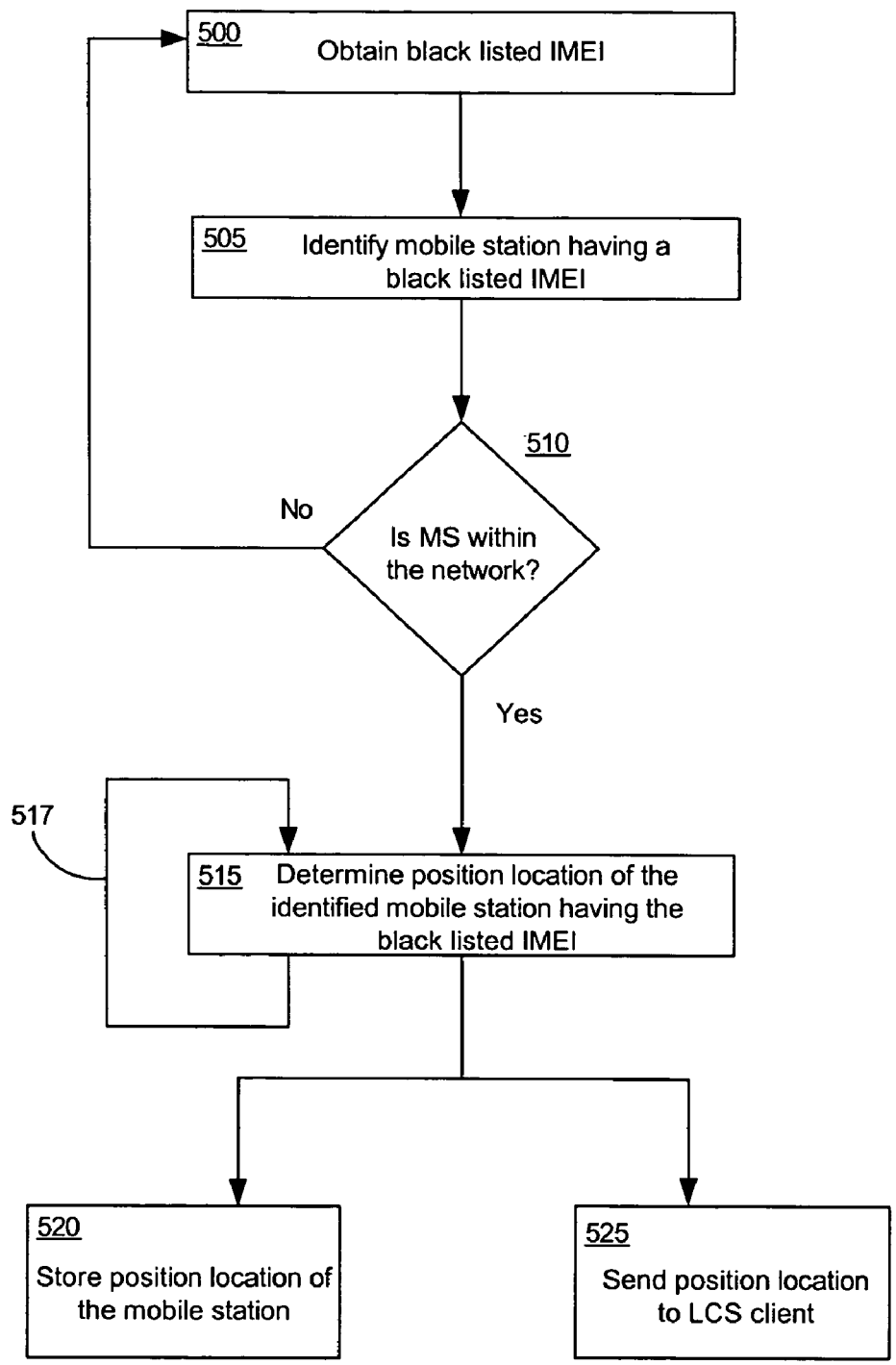
FIG. 6 illustrates operations for identifying and locating a mobile station.

FIG. 6 shows another exemplary process for identifying and locating lost, stolen, or otherwise forbidden mobile stations according to embodiments of the invention. In block 500, an initial operation may obtain or identify an IMEI that is on the black list of the EIR 45. This operation may be accomplished by the LCS client 70 or the MSC 25, for example, interrogating the EIR 45 for black listed IMEIs. Obtaining all of the black listed IMEIs found in the EIR is possible, but a resource-sensitive option is to limit the number of IMEIs that are obtained. For example, the EIR 45 may be queried for black listed IMEIs that have only recently been listed in the database (for example, the last day, week, month, and so on), or those which have been recently used or present within the network.

Regardless of how the black listed IMEI is identified, another operation is to identify the particular mobile station that is associated with the black listed IMEI (block 505). This may be accomplished by querying the appropriate database such as the EIR 45, HLR 50, or the VLR 55. The next operation, which is optional, determines whether or not the mobile station is present within the network (block 510). Typically, this information is readily available from either the HLR or the VLR. If the mobile station is not within the network, processing may flow back to block 500 and the process may be repeated with a different IMEI. On the other hand, if the mobile station is within the network, processing may flow to block 515 where a location determination process is initiated. The locating, storing, and sending operations of blocks 515, 517, 520, and 525 may be accomplished in a manner that is similar to that described in blocks 405, 407, 410, and 415 of FIG. 5.

Although embodiments of the present invention may be implemented using the exemplary series of operations shown in FIGS. 3-6, those of ordinary skill in the art will realize that additional or fewer operations may be performed. Moreover, it is to be understood that the order of operations shown in these figures is merely exemplary and that no single order of operation is required. In addition, the various procedures and operations described herein may be implemented in computer software, hardware, or some combination thereof.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

What is claimed is:

1. A system to geographically locate mobile stations within a mobile communication network, each of said mobile stations having a unique equipment identifier, the system comprising:
   an equipment database comprising equipment identifiers, each equipment identifier uniquely associated with a particular mobile station, each of said equipment identifiers further associated with an equipment status;
   a control unit adapted to: (1) monitor information indicative of unique equipment identifiers of a plurality of mobile stations operating within the mobile communication network, (2) compare the information indicative of the unique equipment identifiers for each of the plurality of active mobile stations with equipment identifiers included in the equipment database to identify a tamper event associated with a targeted mobile station, (3) in response indentifying the tamper event modify said equipment status associated therewith to a status indicating position information is desired, and (4) initiate a position location operation for the targeted mobile station in response to the status indicating position information is desired;
   a location determination entity adapted to provide position location information for said targeted mobile station in response to initiation of the position location operation, the position location information identifying at least an estimated current geographical location of said targeted mobile station; and
   a location services (LCS) client interfacing with said control unit and in communication with said location determination entity, wherein said location determination entity is adapted to provide said position location information for said targeted mobile station to said LCS client in real-time or near real-time to allow said LCS to track said targeted mobile station over a period of time.

2. The system according to claim 1, wherein said status indicating position information is desired comprises a status indicating that the unique equipment identifier is included on a black list, said black list comprising a plurality of unique equipment identifiers corresponding to mobile units that are at least one of lost, defective, stolen, and malfunctioning.

3. The system according to claim 1, wherein said position location information comprises a velocity of said targeted mobile station.

4. The system according to claim 1, wherein said mobile communication network comprises a code division multiple access (CDMA) network, said equipment database comprises an equipment identity register (EIR), said control unit comprises a mobile switching center (MSC), said location determination entity comprises a position determining entity (PDE), and said equipment identifiers comprise electronic serial numbers (ESNs).

5. The system according to claim 1, wherein said mobile communication network comprises, a code division multiple access (CDMA) network, said equipment database comprises an equipment identity register (EIR), said control unit comprises a mobile switching center (MSC), said location determination entity comprises a position determining entity (PDE), and said equipment identifiers comprise a Mobile Equipment Identity (MEID).

6. The system according to claim 1, wherein said mobile communication network comprises a global system for mobile communications (GSM) network, said equipment database comprises an equipment identity register (EIR), said control unit comprises a mobile switching center (MSC), said location determination entity comprises a service mobile location center (SMLC), and said equipment identifiers comprise international mobile equipment identifiers (IMEIs).

7. The system according to claim 1, wherein said location determination entity responsively provides said position location information using at least one position location determination method selected from the group consisting of timing advance (TA), time of arrival (TOA), angle of arrival (AOA), observed time difference (OTD), time difference of arrival (TDOA), enhanced observed time difference (EOTD), observed time difference of arrival (OTDOA), global positioning system (GPS), assisted global positioning system (AGPS), geographical proximity detection, cell sector, mixed cell sector, and ranging via signal strength.

8. The system according to claim 1, further comprising:
   an interface to a centralized database comprising equipment identifiers each uniquely associated with mobile stations associated with a plurality of mobile communication networks, said equipment identifiers of said centralized database identifying a particular status of associated mobile stations operating within said plurality of mobile communication networks, wherein;
   said equipment database is periodically updated with equipment. identifiers in said centralized database.

9. A system for targeting mobile stations and geographically locating targeted mobile stations within the mobile communication network, said system comprising:
   means for obtaining unique equipment identifiers from a plurality of individual mobile stations operating within a mobile communication network;
   an equipment database that includes equipment identification information, said equipment database including a plurality of equipment identifiers each uniquely associated with a mobile station and an equipment status associated with each of said equipment identifiers;
   a control unit for associating each of said obtained equipment identifiers with equipment identifiers and equipment status in said database, said control unit targeting mobile stations that have an equipment status that is black listed, said control unit further targeting mobile stations determined to have a tamper event associated therewith, said control unit being further adapted to initiate a position location operation for each said targeted mobile station;

a location determination entity for determining position location information for said targeted mobile stations in response to said control unit initiating said position location operation, the position location information identifying at least an estimated current geographical location of said targeted mobile station; and a location services (LCS) client interfacing with said control unit and in communication with said location determination entity, said location determination entity being adapted to provide said position location information for said targeted mobile station to said LCS client in real-time or near real-time to allow said LCS to track said targeted mobile station over a period of time.

10. The system of claim 9, wherein said black list is defined by an equipment status that is at least one of lost, defective, stolen, and malfunctioning.

11. The system of claim 9, wherein said control unit also targets mobile stations that have an equipment status that is grey listed.

12. The system of claim 9, wherein the unique equipment identifiers comprise at least one of an IMEI, an ESN, and a MEID.

13. The system of claim 9, wherein said position location information further comprises a velocity of said targeted mobile station.

14. The system of claim 9, further comprising an interface to a centralized database comprising equipment identifiers each uniquely associated with mobile stations associated with a plurality of mobile communication networks, said equipment identifiers of said centralized database identifying a particular status of associated mobile stations operating within said plurality of mobile communication networks, wherein said equipment database is periodically updated with equipment identifiers in said centralized database.

* * * * *